Figure 1:
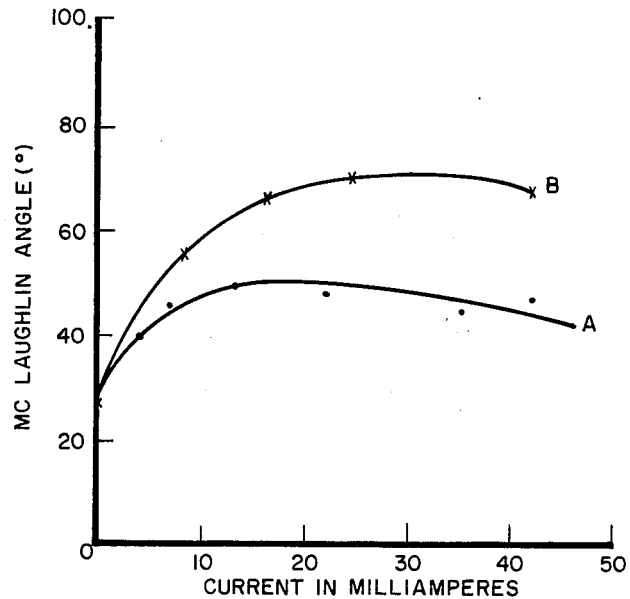

EARL GORDON JAMES JR.
INVENTOR.

BY Ernest G. Peterson
AGENT

United States Patent Office 3,245,896
Patented Apr. 12, 1966

3,245,896
METHOD OF TREATING POLYPROPYLENE FILM
Earl G. James, Jr., Wilmington, Del., assignor to Hercules Powder Company, Wilmington, Del., a corporation of Delaware
Filed June 25, 1962, Ser. No. 204,777
3 Claims. (Cl. 204—168)

The present invention relates to a method of treating stereoregular polypropylene film to improve the anchorage or adherence of the surface thereof to heat-sealable coatings.

Stereoregular polypropylene, i.e., predominantly crystalline polypropylene, is a relative new synthetic polymer that is finding wide acceptance in the plastics art. One of the most promising uses for this new polymer is in the manufacture of film, particularly oriented film, which in turn finds use in the packaging and related arts. For certain types of film, coatings which improve the barrier properties of the film and heat sealability are a requisite. While stereoregular polypropylene film can be heat-sealed to itself, the high temperature necessary for heat-sealing destroys orientation in an oriented film and causes film shrinkage.

One approach which has been made to solve the heat-sealing difficulties of oriented stereoregular polypropylene film is to provide the film with a coating of a material that is more heat sensitive and, hence, heat sealable at a lower temperature than the film itself. This approach, however, has met with frustration because stereoregular polypropylene is unreceptive to the majority of lacquers and similar materials that are normally used as heat-sealable coatings on other films such as films of regenerated cellulose. The major problem in the case of stereoregular polypropylene is that of adhesion; in fact, the majority of coatings adhere so poorly to this polymer that they can be removed almost effortlessly by peeling or scraping.

In order to obtain better adhesion on stereoregular polypropylene film, attempts have been made to modify the surface properties of the film and thus make it receptive to heat-sealable coatings by the published methods for treating polyethylene and other synthetic polymers that result in an increase in the surface tension and render the polymer receptive to printing inks. Such methods included, for instance, heat and flame treatment, electrostatic discharge, chemical treatment with agents such as ozone, gaseous halogen, ultraviolet light, chromic acid, and mixtures of soldium dichromate and sulfuric acid. However, it quickly became apparent that pretreatments which render stereoregular polypropylene receptive to printing inks do not necessarily render it receptive to heat-sealable coating compositions. These prior art pretreatments improve the adhesion of most inks and coatings only to the extent that the adhesion of the coating to the polyolefin surface is greater than to a pressure sensitive tape and, hence, cannot be removed by a so-called "tape test." However, the adhesion level required with heat-sealable coatings in order to achieve maximum effectiveness, i.e., a degree of adhesion of the coating to the polyolefin surface equal to or greater than the cohesive force of the coating to itself when heat-sealed, is not obtainable with these prior art pretreatments, and the coatings (or inks) upon heat-sealing and peeling lift free from the treated polyolefin surface.

It is known from U.S. 2,859,480 to treat polyethylene articles with a pulsating electrostatic discharge at an elevated temperature for improving the printability of the articles with ink. However, the use of an elevated temperature in this known process is solely for the purpose of attaining higher current efficiency, i.e., to decrease the power input requirements of the previously known room temperature process.

The degree of adhesion necessary for satisfactory adherence of printing inks to the surfaces of stereoregular polypropylene has been found to be quite different from that degree necessary to provide the same surfaces with a heat-sealable coating. In fact, at room temperature stereoregular polypropylene film cannot be made receptive to heat-seal coatings by treatment with an electrostatic discharge no matter how high the intensity of the discharge may be. It has now been found that the predominant factor in the case of creating a coating-receptive surface on stereoregular polypropylene film is the temperature during the electrostatic discharge treatment, and that only by raising the temperature to at least about 160° F. can this film be made receptive to heat-sealable coatings.

In accordance with the previous explanation, this invention is directed to a method of treating a surface of stereoregular polypropylene film to improve its receptivity to heat-sealable coating compositions which comprises subjecting said surface to a pulsating electrostatic discharge while the film is at a temperature of at least about 160° F.

The treatment of the film at a temperature of at least about 160° F. by means of pulsating elestrostatic discharge can be accomplished by known means with any of several available power generating units in which any known means can be employed to heat the film to the desired temperature, as, for instance, steam-heated rollers, infrared lamps, heated baths, etc.

Specific descriptions of typically useful methods and apparatus can be found in U.S. 2,859,480, 2,859,481, 2,881,-470, 2,916,620, 2,939,956, and 3,018,189. The preferred method for use in the invention comprises passing the film over a rotating, grounded roll which has been heated to a temperature of at least about 160° F. and creating the pulsating electrostatic discharge between the roll and one or more electrodes spaced from less than 10 mils to upwards of about 100 mils from the roll.

For purposes of this invention, the effectiveness of the pulsating electrostatic discharge treatment is measured as the McLaughlin angle using the method and apparatus described by T. F. McLaughlin, Jr., SPE Journal 16, 710 (1960). Briefly, in this measurement a metered water drop is placed on the horizontal film surface, the film inclined at a rate of 1° per second, and the angle between horizontal and the plane of the film at which the water drop first begins to roll across the film surface is recorded as the McLaughlin angle. The surface of stereoregular polypropylene film which is treated in accordance with the present invention so that it is adherent to heat-sealable coatings will have a McLaughlin angle of at least 60°.

Figure 2:
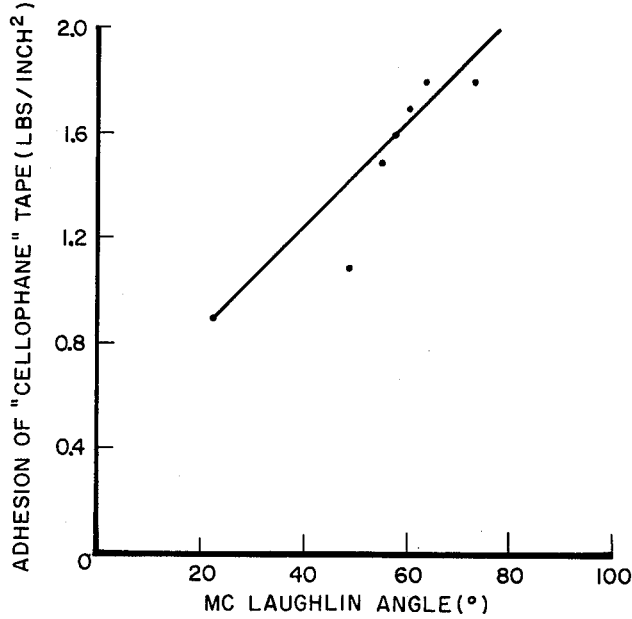

The invention will now be described in greater detail with reference to the examples and the accompanying drawings wherein: FIGURE 1 is a graph in which the intensity of treatment (measured as current in milliamperes) using a pulsating electrostatic discharge is plotted against the effectiveness of the treatment (measured as McLaughlin angle) at two different temperature levels, the curves designating the relationship which exists when oriented polypropylene film is subjected to various intensities of pulsating electrostatic discharge at a temperature of 70° F. (curve A) and at 170–175° F. (curve B); and FIGURE 2 is a graph illustrating the relationship of the adhesion of oriented stereoregular polypropylene film to the effectiveness of a pulsating electrostatic discharge treatment, the severity of which is measured as McLaughlin angle.

Referring to FIGURE 1, the graph clearly shows that a fairly constant McLaughlin angle is soon reached at a given temperature level and that further increase in the intensity of treatment causes a slight decrease in McLaughlin angle. The data employed to plot the diagrams of FIGURE 1 are tabulated below in Table I and were obtained by McLaughlin angle measurements made on oriented stereoregular polypropylene film 0.75 mil thick which had been passed at 75 feet per minute over a grounded roll covered with 10 wraps of 1-mil poly(ethylene terephthalate) film at the specified temperature and through a pulsating electrostatic discharge generated between an electrode spaced 15 mils from the roll by means of a unit consisting essentially of a 3200 cycles-per-second alternator and a step-up transformer. The primary circuit was supplied with a current of 1.2 to 4.8 amperes at 100 to 190 volts and the power in the secondary or electrode circuit was 4 to 42 milliamperes and 4300 to 9600 volts, the current intensity being varied by a rheostat in the primary circuit. Current measurements were made by radio frequency ammeter.

TABLE I

|  | McLaughlin angle (°) | Current in milliamperes |
| --- | --- | --- |
| Curve A—Roll temperature, 70° F. | 29 | 0 |
|  | 40 | 4 |
|  | 45 | 7 |
|  | 49 | 13 |
|  | 48 | 22 |
|  | 45 | 36 |
|  | 47 | 42 |
| Curve B—Roll temperature, 170–175° F. | 28 | 0 |
|  | 52 | 4 |
|  | 55 | 8 |
|  | 66 | 16 |
|  | 70 | 24 |
|  | 68 | 42 |

Conventional heat-sealable coatings exhibited poor adherence to the film treated at 70° F. (curve A) but exhibited excellent adherence to the film treated at 170–175° F. (curve B).

The linear relationship of McLaughlin angle and the adhesiveness of the surface of oriented stereoregular polypropylene film is indicated in FIGURE 2. The adhesiveness was measured by the following test method: One-inch wide "cellophane" tape (acetate tape pressure wound) was pressed onto the surface of electrostatically treated film by means of an about 9-pound roller, the film and tape ensemble cut by means of a razor blade cutter to 1½-inch strips while centering the tape, and the strips conditioned for 24 hours at 50% relative humidity. The load required to peel the tape at 180° from the film strip at a rate of 12 inches/min. was measured with a standard Scott tester. The oriented stereoregular polypropylene film was treated with a pulsating electrostatic discharge at various temperature levels to give the desired McLaughlin angle using the method described above, the film in this case being 0.5 mil thick, the primary circuit being supplied with a current of 2.2 to 2.7 amperes at 1900 volts, and the power in the secondary or electrode circuit being 12 milliamperes at 1900 volts. Data employed to plot the diagram of FIGURE 2 are tabulated below in Table II.

TABLE II

| Treatment temperature (° F.) | McLaughlin angle (°) | Cellophane tape peel (lb./in.) |
| --- | --- | --- |
| Untreated | 22 | 0.9 |
| 75 | 48 | 1.1 |
| 140 | 55 | 1.5 |
| 155–160 | 58 | 1.6 |
| 165–170 | 60 | 1.7 |
| 175 | 63 | 1.8 |
| 195–200 | 72 | 1.8 |

The invention is further illustrated by the following detailed examples in which parts are by weight unless otherwise specified.

In the following examples the coated film was examined to determine the degree of adhesion of the coating and heat-sealing characteristics. Adhesion was evaluated by applying a strip of conventional transparent pressure-sensitive "cellophane" tape to the surface of the coated film with sufficient pressure to assure complete adhesion. The tape was then jerked from the surface and the adhesion gauged by observing what part, if any, of the coating was removed by the tape. In this test a rating of "good" was assigned if no coating was stripped from the film; a rating of "fair" if less than 10% of the coating was stripped; a rating of "poor" if more than 50% of the coating was stripped; and a rating of "very poor" if all of the coating was stripped from the film.

The heat-sealing characteristics were evaluated by heat-sealing the coated film (coated side facing coated side) employing a commercial heat sealer for 0.25 second at 300° F. and 20 p.s.i. pressure. The characteristics of the seal were then determined by pulling this seal apart by hand at an angle of 90° and observing the manner in which seal failure occurred. The following rating schedule was employed to designate the degree and type of failure:

1=complete rupture of polypropylene film
2=internal rupture of coating
3=film rupture with some lifting of coating
4=lifting of coating.

The thickness of the coating is not critical but for optimum results should be from about 0.04 to about 0.1 mil.

The term "RSV" as used herein denotes reduced specific viscosity, which is the specific viscosity divided by concentration of a 0.1% weight/volume solution of polymer in decahydronaphthalene at 135° C.

*Examples 1–2*

Oriented stereoregular polypropylene film 0.75 mil thick made from polymer having an RSV of about 2.7 was surface treated by passing the film at 75 feet per minute over a grounded 6-inch diameter steam-heated roller covered with 10 wraps of 1-mil thick poly(ethylene terephthalate) film and through a pulsating electrostatic discharge between an 8-inch knife edge electrode and the roller at a point 180° from the initial roll-film contact, the electrode-film (air) gap being 15 mils. The surface temperature of the poly(ethylene terephthalate) film used to wrap the roller was 175° F. as measured by a portable thermocouple temperature-indicating device. The polypropylene film being treated reached about the same temperature before reaching the point where it was subjected to electrostatic discharge. Electrical power for the discharge was generated by a unit consisting essentially of a 3200 cycles-per-second alternator and a step-up transformer. The primary circuit was supplied with a current of 4.5 amps. at 180 volts and the power in the secondary or electrode circuit was about 42 milliamperes and 7500 volts. In these examples the McLaughlin angle was measured as 68°. Separate portions of the treated film were coated with the following coating compositions using a #14 Meyer rod, after which each portion was dried at a distance of 7 inches below a bank of 250-watt infrared heaters:

| Coating composition | Parts by weight | |
| --- | --- | --- |
|  | Ex. 1 | Ex. 2 |
| SS ½ sec. nitrocellulose | 12.5 |  |
| Diethylene glycol ester of α-terpinene-maleic anhydride adduct | 9.0 |  |
| Dicyclohexyl phthalate | 3.5 |  |
| Butyl acetate | 15.0 |  |
| Ethyl acetate | 7.5 |  |
| Toluene | 37.5 |  |
| 2B alcohol | 15.0 |  |
| Poly(vinylidene chloride)–acrylonitrile copolymer—7 mole percent acrylonitrile |  | 20 |
| Methyl ethyl ketone |  | 80 |

The coated films rated "good" in the adhesion test and gave a heat sealability rating of 1. As a standard comparator, commercial heat-sealable film of regenerated cellulose rated "good" in the adhesion test and gave a heat sealability rating of 2.

Example 3

The procedure of Examples 1 and 2 was repeated using 1 mil film of unoriented stereoregular polypropylene made from polymer having an RSV of 2.7, the film being surface treated and coated as in Examples 1 and 2. Good adhesion and a heat sealability rating of 2 resulted.

Examples 4-9

The effect of temperature of electrostatic treatment on anchorage and heat sealability is demonstrated by the following examples wherein oriented films of the stereoregular polypropylene of Examples 1 and 2 were passed through a pulsating electrostatic discharge at various temperatures using the procedure of Examples 1 and 2. In these examples the electrostatic discharge conditions in the electrode circuit were maintained constant at 12 milliamperes and 1900 volts while the primary circuit was supplied with 2.2 to 2.7 amperes at 1900 volts. Separate portions of the treated films were coated with the following coating compositions using the procedure of Examples 1 and 2:

Coating Composition A: | Parts by weight
--- | ---
SS ½ sec. nitrocellulose | 12.5
Diethylene glycol ester of α-terpinene-maleic anhydride adduct | 9.0
Dicyclohexyl phthalate | 3.5
Butyl acetate | 15.0
Ethyl acetate | 7.5
Toluene | 37.5
2B alcohol | 15.0

Coating Composition B: |
--- | ---
Chlorinated rubber (67% by weight chlorine) | 8.0
Dicyclohexyl phthalate | 2.0
Toluene | 90.0

Coating Composition C: |
--- | ---
Poly(vinylidene chloride—acrylonitrile) copolymer (7% acrylonitrile) | 20.0
Methyl ethyl ketone | 80.0

Coating Composition D: |
--- | ---
Resinous condensation product of dilinoleic acid and ethylene diamine (average molecular weight 3000-6500 and ball and ring softening point of 105-115° C.) | 20.0
Toluene | 32.0
2B alcohol | 48.0

Coating Composition E: |
--- | ---
Poly(vinyl chloride—vinyl acetate) copolymer (87% vinyl chloride) | 20.0
Acetone | 80.0

Details of the examples are set forth in Table III.

Stereoregular polypropylene which is used in making the film that is treated according to the process of this invention is a known polymer of commerce characterized by a predominant content of crystallizable, stereoregular macromolecules.

The compositions that are useful as heat-sealable coatings for stereoregular polypropylene film that has been treated in accordance with the invention include the vinyl polymers, such as copolymers of vinylidene chloride and acrylonitrile and copolymers of vinyl chloride and vinyl acetate, chlorinated rubbers, nitrocellulose, polyamides, and the like, which are heat sealable at a temperature sufficiently low to avoid loss of orientation or softening of the film when the film is sealed. The coating composition can also contain other ingredients, including, by way of example, pigments, dyes, plasticizers, and the like, provided they do not detract from the property of sealability.

The coatings can be applied to the pretreated film in the form of solutions in any volatile, inert vehicle which is a solvent. Any convenient manipulative technique, such as brushing, rolling, spraying, or dipping, can be employed to coat the film.

No critical maximum temperature exists at which the process of the invention becomes inoperable. Any temperature above about 160° F. but below the temperature at which the film becomes too weak or soft to be processed, or in the case of oriented film causes loss of orientation, can be used.

In accordance with known practice, considerable variation can be made in the voltage, frequency, and amperage of the electrostatic discharge. Voltage can vary, for instance, from about 1000 volts up to about 20,000 volts. Any frequency from standard to radio frequency can be employed, and a current in the electrode circuit of about 0.0015 to about 10 amperes is satisfactory, the optimum depending on the width of film and speed of treatment.

What I claim and desire to protect by Letters Patent is:

1. The method of treating a surface of stereoregular polypropylene film to render it adherent to heat-sealable coatings to the degree that the adhesion of said coating to the film surface is at least equal to the cohesive force of said coating to itself when heat-sealed which comprises subjecting said surface to a pulsating electrostatic discharge while the film is at a temperature of at least about 160° F., the treated surface thereby having a McLaughlin angle of at least 60°.

2. The method according to claim 1 in which said polypropylene film is an oriented stereoregular polypropylene film.

3. The method according to claim 1 in which the film temperature is about 170 to about 195° F.

(References on following page)

TABLE III

| Example | Temp. of elec. treat. (° F.) | McLaughlin angle (°) | Adhesion* Coating composition | | | | | Heat sealability ratings Coating composition | | | | |
| --- | --- | --- | --- | --- | --- | --- | --- | --- | --- | --- | --- | --- |
| | | | A | B | C | D | E | A | B | C | D | E |
| | Untreated | 22 | VP | P | VP | P | VP | 4 | 4 | 4 | 4 | 4 |
| 4 | Room temp. (75°). | 48 | VP | F | F | G | P | 4 | 4 | 4 | 3 | 4 |
| 5 | 140 | 55 | P | G | F | G | P | 4 | 4 | 3 | 3 | 4 |
| 6 | 155-160 | 58 | F | G | F | G | G | 3 | 3 | 3 | 1 | 3 |
| 7 | 165-170 | 60 | F | G | G | G | G | 1 | 2 | 1 | 1 | 1 |
| 8 | 175 | 63 | G | G | G | G | G | 1 | 2 | 1 | 1 | 1 |
| 9 | 195-200 | 72 | G | G | G | G | G | 1 | 2 | 1 | 1 | 1 |

*The adhesion ratings of good, fair, poor, and very poor are denoted by the symbols G, F, P, and VP, respectively.

References Cited by the Examiner

UNITED STATES PATENTS

| | | | |
|---|---|---|---|
| 2,859,480 | 11/1958 | Berthold et al. | 204—168 |
| 2,859,481 | 11/1958 | Kaghan et al. | 204—168 |
| 2,864,755 | 12/7958 | Rothacker | 204—165 |
| 3,017,339 | 1/1962 | Dewey | 204—165 |
| 3,067,119 | 12/1962 | Ramaika | 204—168 |
| 3,102,163 | 8/1963 | Dobens | 250—49.5 |
| 3,132,246 | 5/1964 | Mosher et al. | 250—49.5 |
| 3,157,785 | 11/1964 | Dobson et al. | 250—49.5 |

JOHN H. MACK, *Primary Examiner.*

H. S. WILLIAMS, *Assistant Examiner.*